US010480808B2

(12) United States Patent
Keil et al.

(10) Patent No.: US 10,480,808 B2
(45) Date of Patent: Nov. 19, 2019

(54) ENERGY MANAGEMENT COMPUTER SYSTEM

(71) Applicant: EnerAllies, Inc., Redwood City, CA (US)

(72) Inventors: Robert S. Keil, Los Altos, CA (US); Stephen C. Maruyama, Aptos, CA (US)

(73) Assignee: EnerAllies, Inc., Los Altos, CA (US)

( * ) Notice: Subject to any disclaimer, the term of this patent is extended or adjusted under 35 U.S.C. 154(b) by 364 days.

(21) Appl. No.: 15/295,841

(22) Filed: Oct. 17, 2016

(65) Prior Publication Data
US 2017/0032476 A1 Feb. 2, 2017

Related U.S. Application Data

(62) Division of application No. 13/740,103, filed on Jan. 11, 2013, now Pat. No. 9,471,946.
(Continued)

(51) Int. Cl.
F24F 11/50 (2018.01)
G05B 19/02 (2006.01)
(Continued)

(52) U.S. Cl.
CPC .............. F24F 11/50 (2018.01); F24F 11/32 (2018.01); F24F 11/46 (2018.01); F24F 11/56 (2018.01);
(Continued)

(58) Field of Classification Search
CPC .. F24F 11/30; F24F 11/32; F24F 11/46; F24F 11/63; F24F 11/64; F24F 11/70;
(Continued)

(56) References Cited

U.S. PATENT DOCUMENTS 5,539,633 A * 7/1996 Hildebrand ........ G05D 23/1904
700/32
5,752,654 A 5/1998 Mowery
(Continued)

OTHER PUBLICATIONS

U.S. Appl. No. 13/740,103, filed Jan. 11, 2013, Notice of Allowance, dated Jun. 17, 2016.
(Continued)

Primary Examiner — Crystal J Barnes-Bullock
(74) Attorney, Agent, or Firm — Hickman Palermo Becker Bingham, LLP

(57) ABSTRACT

The disclosure provides an energy management system that is based on a distributed architecture that includes networked energy management devices located at a plurality of sites and a collection of energy management program applications and modules implemented by a centralized energy management service unit. The energy management program applications and modules are responsible for facilitating customer access to the system, configuring energy management devices, and collecting, storing, and analyzing energy management data collected from the plurality of sites. The energy management system is adaptable to a wide variety of energy usage requirements and enables customers to configure energy management devices at customer sites using scheduling templates, to define and customize site groupings for device configuration and data analysis purposes, and to request and view various statistical views of collected energy usage data.

16 Claims, 7 Drawing Sheets

Related U.S. Application Data

(60) Provisional application No. 61/631,824, filed on Jan. 12, 2012, provisional application No. 61/631,825, filed on Jan. 12, 2012, provisional application No. 61/631,829, filed on Jan. 12, 2012, provisional application No. 61/631,831, filed on Jan. 12, 2012.

(51) Int. Cl.

| | | |
|---|---|---|
| *G05B 19/042* | (2006.01) | |
| *F24F 11/32* | (2018.01) | |
| *F24F 11/46* | (2018.01) | |
| *F24F 11/61* | (2018.01) | |
| *F24F 11/62* | (2018.01) | |
| *F24F 11/63* | (2018.01) | |
| *F24F 11/56* | (2018.01) | |
| *G05B 23/02* | (2006.01) | |
| *G06Q 10/06* | (2012.01) | |
| *G05B 15/02* | (2006.01) | |
| *G05B 13/02* | (2006.01) | |
| *G06Q 50/06* | (2012.01) | |
| *B60H 1/00* | (2006.01) | |
| *F24F 130/00* | (2018.01) | |
| *F24F 130/10* | (2018.01) | |
| *F24F 110/12* | (2018.01) | |

(52) U.S. Cl.
CPC ............. *F24F 11/61* (2018.01); *F24F 11/62* (2018.01); *F24F 11/63* (2018.01); *G05B 13/021* (2013.01); *G05B 15/02* (2013.01); *G05B 19/02* (2013.01); *G05B 19/042* (2013.01); *G05B 23/0235* (2013.01); *G06Q 10/0639* (2013.01); *G06Q 50/06* (2013.01); *B60H 2001/00733* (2019.05); *F24F 2110/12* (2018.01); *F24F 2130/00* (2018.01); *F24F 2130/10* (2018.01); *G05B 2219/2639* (2013.01); *G05B 2219/2642* (2013.01)

(58) Field of Classification Search
CPC ............. F24F 2110/00; F24F 2110/20; F24F 2130/00; F24F 2130/10; F24F 2140/60; G05B 15/02; G05B 2219/2642; G05D 23/1904; G05D 23/1923; Y02B 70/3216; Y02B 70/3241; Y04S 10/40; Y04S 20/221; Y04S 20/227

See application file for complete search history.

(56) References Cited

U.S. PATENT DOCUMENTS

| | | | | |
|---|---|---|---|---|
| 5,924,486 | A * | 7/1999 | Ehlers | G05D 23/1923 165/238 |
| 6,216,956 | B1 * | 4/2001 | Ehlers | G05D 23/1923 236/47 |
| 6,625,995 | B2 | 9/2003 | Rernond | |
| 8,063,775 | B2 | 11/2011 | Reed | |
| 8,091,795 | B1 | 1/2012 | McLellan et al. | |
| 8,219,252 | B2 | 7/2012 | Nanami | |
| 8,301,335 | B2 | 10/2012 | Hill | |
| 8,429,003 | B2 * | 4/2013 | Zaloom | G06Q 10/0639 705/7.39 |
| 8,571,922 | B2 * | 10/2013 | Zaloom | G06Q 10/0639 705/7.39 |
| 8,682,527 | B2 | 3/2014 | Senthil | |
| 8,930,030 | B2 | 1/2015 | Bester | |
| 9,074,782 | B2 | 7/2015 | Kinoshita | |
| 9,568,910 | B2 * | 2/2017 | Drees | G05B 15/02 |
| 9,606,520 | B2 * | 3/2017 | Noboa | G05B 15/02 |
| 9,835,352 | B2 * | 12/2017 | Devenish | F24F 11/30 |
| 10,088,185 | B2 * | 10/2018 | Taylor | F24F 11/30 |
| 2007/0043478 | A1 | 2/2007 | Ehlers et al. | |
| 2010/0070089 | A1 | 3/2010 | Harrod | |
| 2011/0306288 | A1 | 12/2011 | Murayama | |
| 2012/0042672 | A1 | 2/2012 | Fujihara | |
| 2012/0203379 | A1 | 8/2012 | Sloo et al. | |
| 2013/0261808 | A1 * | 10/2013 | Besore | G05D 23/1904 700/278 |

OTHER PUBLICATIONS

U.S. Appl. No. 13/740,103, filed Jan. 11, 2013, Office Action, dated Nov. 25, 2015.

U.S. Appl. No. 13/740,103, filed Jan. 11, 2013, Restriciton Requirement, dated Sep. 21, 2015.

* cited by examiner

ENERGY MANAGEMENT COMPUTER SYSTEM

CROSS-REFERENCE TO RELATED APPLICATIONS; BENEFIT CLAIM

This application claims the benefit under 35 U.S.C. § 120 as a divisional of application Ser. No. 13/740,103, filed Jan. 11, 2013, now U.S. Pat. No. 9,471,946, which claims the benefit under 35 U.S.C. § 119(e) of provisional application 61/631,824, filed Jan. 12, 2012, provisional application 61/631,825, filed Jan. 12, 2012, provisional application 61/631,829, filed Jan. 12, 2012, and provisional application 61/631,831, filed Jan. 12, 2012, the entire contents of which are hereby incorporated by reference for all purposes as if fully set forth herein.

TECHNICAL FIELD

The present disclosure generally relates to energy management computer programs, computer systems, and computer-assisted solutions. The disclosure relates more specifically to a networked, cloud-based energy management computer system that provides for centralized management and control of multiple energy management devices located at a plurality of sites, and analysis of energy usage data collected across site boundaries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Energy costs typically represent one of the largest ongoing expenses associated with a business enterprise's commercial leases. As a result, business enterprises and other institutions are increasingly looking to some form of automated energy management solution in an attempt to monitor and reduce costs associated with energy usage at commercially operated sites.

For business enterprises such as small footprint retail and food service chains that may operate a large number of sites across a wide geographic area, past energy management solutions have had serious shortcomings. For example, according to industry studies, only a small percentage of small footprint commercial sites are automated with a computer-based energy management system. Instead, the vast majority of commercial sites are equipped with outdated manual or programmable thermostats that typically require configuration and management by a local site manager or other employees. However, a typical site manager is often saddled with a variety of other job responsibilities that leave few resources to properly configure and manage thermostats and other energy management devices for optimal energy usage. The financial implications of this mismanagement are potentially considerable, particularly for enterprises that control hundreds or thousands of sites.

Of the commercial sites that have an energy management system, these systems are typically implemented as costly, custom-designed solutions that target individual site locations and are often bundled with expensive professional services to maintain the systems. The prior energy management approaches have been a poor fit for business enterprises that manage a large number of small footprint sites by failing to provide a scalable energy management system that provides centralized control of an enterprise's energy management devices across multiple sites, and that enables valuable analysis and insight into an enterprise's energy usage across site boundaries in order to optimize energy usage.

SUMMARY

The appended claims may serve as a summary of the invention.

DETAILED DESCRIPTION

Figure 1:
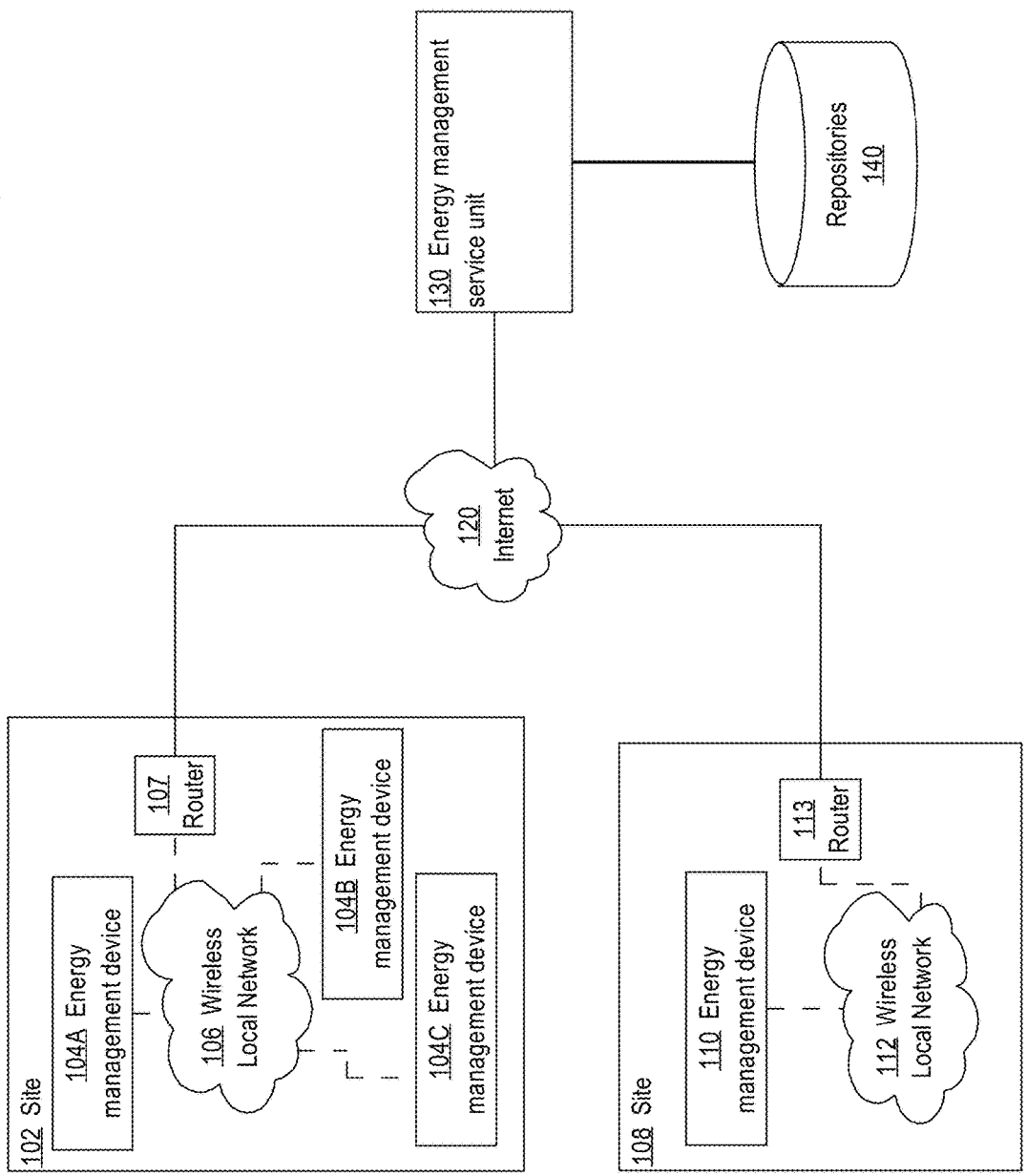
FIG. 1 is a block diagram that illustrates an overview of an energy management system that includes an energy management service unit in relation to a plurality of sites that each include one or more energy management devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Implementation of Energy Management System
   3.1 Energy Management Devices
   3.2 Energy Management Platform
      3.2.1 Data Collection
      3.2.2 Energy Management Portal
      3.2.3 Site Groupings
      3.2.4 Energy Management Applications
         3.2.4.1 Automated Controls
         3.2.4.2 Analytics
         3.2.4.3 Behavioral Learning
4.0 Implementation Mechanisms—Hardware Overview
1.0 General Overview In an embodiment, a computer-implemented method comprises receiving, by an energy management service unit that is configured to be coupled to a plurality of energy management devices of a plurality of sites, energy usage data of a particular site of the plurality of sites; wherein the energy usage data includes information indicating one or more temperature setpoints of a particular energy management device of the particular site and, for each of the one or more temperature setpoints, one or more first values indicating one or more of: an amount of time elapsed for the particular site to reach the each of the one or more temperature setpoints, an amount of energy consumed by the particular energy management device to reach each of the one or more temperature setpoints, and an amount of time the particular energy management device is activated to reach each of the one or more temperature setpoints; generating, based on the energy usage data, one or more second values indicating one or more of: an average amount of time elapsed to change the temperature of the particular site by one or more degrees, an average amount of energy consumed by the particular energy management device to change the temperature of the particular site by one or more degrees, and an average amount of time the particular energy management device is activated to change the temperature of the site by one or more degrees; determining that one or more of the one or more second values exceeds a specified threshold value; in response to determining that one or more of the one or more second values exceeds the specified threshold value, generating a notification.

In an embodiment, the notification includes one or more of: an email message, a Short Message Service (SMS) message, an alert message displayed on a web portal.

In an embodiment, the energy management device comprises a programmable thermostat including a Wi-Fi subsystem, and wherein the energy management device is configured to periodically send particular energy usage data to the energy management service unit.

In an embodiment, the computer-implemented method further comprises the energy usage data further including information indicating an amount of energy consumed to reach the one or more temperature setpoints; generating, based on the energy usage data, a second value indicating an average amount of energy consumed to change the temperature of the particular site by one or more degrees; determining that the second value exceeds a second specified threshold value; in response to determining that the second value exceeds the second specified threshold value, generating a second notification.

In another embodiment, a computer-implemented method comprises receiving, by an energy management service unit that is configured to be coupled to a plurality of energy management devices of a plurality of sites, energy usage data of a particular site of the plurality of sites; wherein the energy usage data includes information indicating one or more temperature setpoints of a particular energy management device of the particular site and, for each of the one or more temperature setpoints, an amount of time elapsed for the particular site to reach the one or more temperature setpoints; generating based on the energy usage data, a value indicating an average amount of time elapsed to change the temperature of the particular site by one or more degrees; receiving, by the energy management service unit, a second value indicating a temperature setpoint for the particular site and third value indicating a particular time of day associated with the temperature setpoint; generating, based on the first value, an energy management device control template that defines one or more energy management device operating parameters, wherein the operating parameters include a fourth value indicating a particular time of day to initiate operation of the energy management device; sending, to the particular energy management device, the energy management device control template.

In another embodiment, a computer-implemented method comprises detecting, by an energy management device of a particular site, a first value of a temperature setpoint configured at the energy management device and a second value of an air temperature of an area outside of the particular site; determining that a difference between the first value and the second value exceeds a specified threshold value; in response to determining that the difference between the first value and the second value exceeds the specified threshold value, configuring the temperature setpoint to a third value; wherein a difference between the third value and the second value is not more than the specified threshold value.

In an embodiment, the second value is based in part on a humidity index value.

In an embodiment, the specified threshold value is specified in a scheduling template, wherein the scheduling template defines one or more energy management device operating parameters to control operation of the energy management device.

In an embodiment, scheduling template further specifies a maximum temperature setpoint value and a minimum temperature setpoint value.

Other embodiments provide other processes that implement the structures of the system recited above and provide a computer-readable storage medium storing instructions which when executed cause performing the functions described herein.

2.0 Structural and Functional Overview

One embodiment provides an energy management system based on a distributed computer-based architecture that includes networked energy management devices located at a plurality of sites and a collection of energy management computer program applications and modules implemented by a centralized energy management service unit. In an embodiment, the energy management program applications and modules are responsible for facilitating customer access to the system and collecting, storing, and analyzing energy management data collected from the devices at the plurality of sites. In an embodiment, the energy management system is adaptable to a wide variety of energy usage requirements and enables customers accessing the system to configure energy management devices using scheduling templates, to define and customize site groupings for device configuration and data analysis purposes, and to request and view various statistical views of collected energy usage data.

In this context, energy management devices are devices that are configured to control and/or monitor one or more energy consuming commercial appliances such as, for example, heating, ventilation, and air conditioning (HVAC) units, lighting units, water pumps, and refrigeration units. In various embodiments, energy management devices may include any of programmable thermostats, power outlet control devices, lighting control devices, refrigeration control devices, motion detection devices, sub-metering devices, water resource management devices, waste management devices, renewable energy management devices, and any combination thereof. In an embodiment, the energy management devices are configured to collect data relating to energy usage or other operating conditions associated with an appliance under the device's control and to send the data to a centralized energy management service unit.

In an embodiment, one or more of the energy management devices may comprise a programmable wireless communications subsystem that enables the devices to communicate with the centralized energy management service unit over one or more wireless or wireline communications networks. In an embodiment, the programmable wireless communications subsystem is implemented using the Wi-Fi wireless communication standard. The use of the Wi-Fi wireless standard in energy management devices provides numerous benefits such as, for example, enabling the devices to wirelessly connect to the Internet without a dedicated gateway device. These and other factors may significantly decrease the costs of system implementation.

In an embodiment, a centralized energy management service unit is coupled to an internetwork or wide area network and is configured to provide a World Wide Web-based management interface, or portal, that enables users to securely access and configure various aspects of the system. For example, users may interact with the portal to configure site groupings, define device scheduling templates, and request various statistical views of collected energy usage data for display in one or more dashboard-like interfaces. The energy management service unit is configured so that, based on various user profiles, the portal may securely control access to application programs and stored energy management data to various users within a customer company, to third-party users that may have a business relation with one or more customers, and to users associated with different customers, who may be competitors. In one embodiment, the energy management service unit may include an application programming interface (API) that enables third-party users to access controlled views of collected energy usage data.

FIG. 1 is a block diagram that illustrates an overview of an energy management system that includes an energy management service unit in relation to a plurality of sites that each includes one or more energy management devices. In this context, a site generally refers to a small footprint building such as a retail store or other commercial building controlled by a customer of the energy management system provider. In an embodiment, sites 102, 108 are coupled through routers 107, 113, respectively, to the Internet 120, and through the Internet 120 to an energy management service unit 130.

In an embodiment, site 102 comprises one or more energy management devices wirelessly coupled to a wireless local network 106 that has connectivity to the Internet 120. For example, site 102 includes three energy management devices 104A-104C. Each of energy management devices 104A-104C may represent a different type of energy management device, or may represent the same type of energy management device as another device located in a different area of site 102. Each of the energy management devices 104A-104C may communicate over wireless local network 106 using wireless connections such as, for example, using the Wi-Fi communication standard. For example, router 107 may comprise a wireless access point that facilitates communication between any wireless energy management devices and the Internet 120. In some embodiments router 107 may be the same router that is used for communication with other computer devices at the site, such as point of sale terminals, inventory computers, or special-purpose computers; in other words, embodiments of the systems and solutions described herein do not require a dedicated router, but can use available bandwidth of a router that is already installed at the site for other purposes.

In an embodiment, one or more wireless energy management devices at site 102 may be configured to communicate directly with one or more other energy management devices. For example, one or more of energy management devices 104A-104C may be configured to communicate directly with other devices using the Wi-Fi Direct protocol or other similar peer-to-peer communication standard. While certain embodiments are described in connection with wireless communication, wired communication or a combination may be used in other embodiments. Direct communication between devices may enable the addition of energy management devices at more locations within site 102 resulting in more detailed energy usage data collection.

Similar to site 102, site 108 includes an energy management device 110. Energy management device 110 is coupled to wireless local network 112 that has connectivity to the Internet 120. Site 108 may be located in a geographically remote location from site 102. For the purposes of illustrating a clear example, FIG. 1 shows only two sites and four energy management devices; however, practical embodiments may include any number of sites and any number of energy management devices located at each site.

Internet 120 may comprise a plurality of public internetworks providing connectivity between sites 102, 108 and energy management device 110. In an embodiment, Internet 120 may comprise a private point-to-point connection of a site to the energy management service unit 130. For example, a client computing device located at site 102 could use the public Internet to connect to energy management service unit 130 for system configuration and reporting purposes, but a private point-to-point connection may be provided for the collection of data from energy management devices 104A-104C. For example, a point-to-point connection could be implemented using an Internet Protocol Security (IPsec) network tunnel or other mechanism providing a secure connection over which collected data may be transmitted. In an embodiment, the secure connection may be made compliant with the Payment Card Industry (PCI) security standards such that the collected data may be transmitted over the same network elements and through network firewalls used by various sites to securely transmit credit cardholder information.

Energy management service unit 130 comprises an energy management platform and a collection of energy management applications and modules, each of which is detailed in other sections below. In general, the energy management applications and modules of energy management service unit 130 are configured to perform energy management device data collection, enable customers to access and manage the energy management system, and provide analysis of collected energy management data.

In an embodiment, energy management service unit 130 is coupled to data repositories 140 which stores collected energy management data, externally collected data, user information, site groupings, scheduling templates, and other data elements utilized by energy management service unit 130 as further described herein. Repositories 140 broadly represent one or more data repositories and various divisions of data collected and stored by the system may be implemented in different embodiments.

3.0 Example Implementation of Energy Management System

Figure 2:
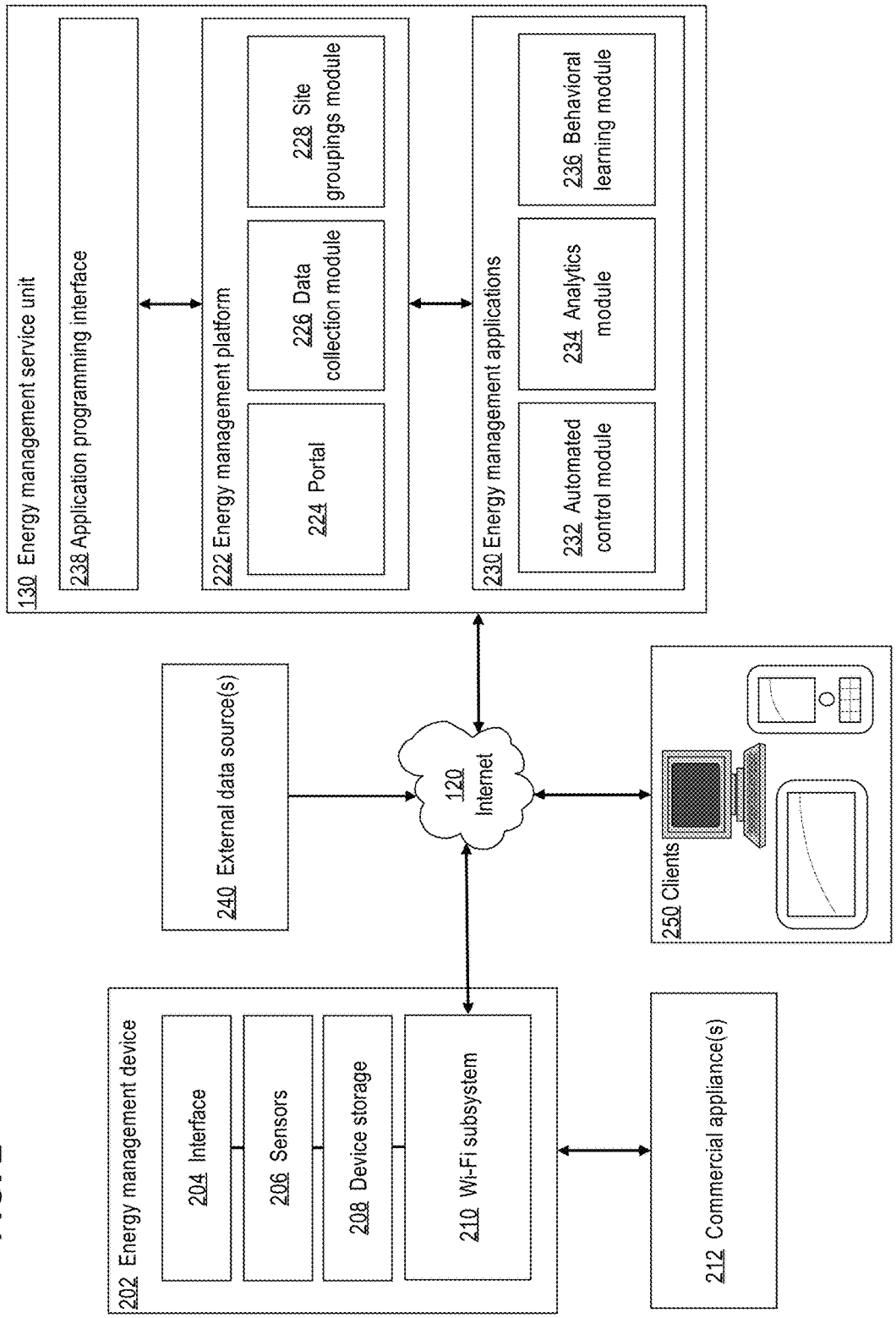
FIG. 2 is a block diagram that illustrates one embodiment of an energy management architecture including an example energy management device and an energy management service unit.

FIG. 2 is a block diagram that illustrates one embodiment of an energy management computer architecture including an example energy management device and an energy management service unit. The various components of FIG. 2 illustrate a system architecture that includes computerized, intelligent energy management devices such as energy management device 202, an energy management platform 222, and a collection of energy management applications 230 that provide for a comprehensive energy management system. Each of energy management platform 222 and energy management applications 230 may be implemented, in various embodiments, as one or more computer programs, code segments, scripts, configuration files, firmware, hardware logic, special-purpose computers, or a combination thereof.

3.1 Energy Management Devices

Referring now to FIG. 2, in an embodiment, energy management device 202 represents an example device that may be deployed at a particular site, so that all devices at the site could be similarly structured, in one embodiment. In an embodiment, an energy management device 202 may comprise an interface 204, one or more sensors 206, device storage 208, and a Wi-Fi subsystem 210. In an embodiment, an energy management device 202 may be mechanically, electrically, or communicatively coupled to one or more commercial appliances 212 for the purposes of controlling the operation of the appliances and/or collecting operating information associated with the appliances to send to energy management service unit 130. The particular approach for coupling, controlling and collecting are not critical.

In an embodiment, interface 204 provides user access to various configuration settings and operating information associated with an energy management device 202 directly at the device. For example, interface 204 may comprise various interface controls that enable a user to configure one or more settings associated with one or more associated commercial appliances 212. Interface 204 may further comprise one or more displays that report operating information associated with commercial appliances 212. As an example, a commercial appliance 212 may be an HVAC unit and interface 204 may provide interface controls that enable a user to configure desired temperature setpoints and that display current temperature conditions and setpoints. Touchscreens, pushbuttons, and similar devices may be used as the interface 204.

In an embodiment, an energy management device 202 may include one or more device sensors 206. Sensors 206 may be configured to detect one or more external or internal conditions associated with the operation of an energy management device 202 or an associated commercial appliance 212. For example, a thermostat device may include one or more sensors 206 configured to detect current temperature and/or humidity conditions or other information associated with the performance of an associated HVAC system. As another example, sensors 206 in a lighting control device may be configured to detect and report current lighting settings in one or more associated lighting devices.

In an embodiment, an energy management device 202 comprises device storage 208. Device storage 208 may store local device configuration settings, scheduling templates, and data collected by sensors 206. Device storage 208 may provide a mechanism for persistent storage of configuration settings and other information in the event of a power failure or communications failure rendering energy management device 202 unable to communicate with energy management service unit 130. For example, in one embodiment, device storage 208 may comprise a flash memory storage chip or other form of persistent data storage.

In an embodiment, an energy management device 202 comprises a Wi-Fi subsystem 210. Wi-Fi subsystem 210 may include programmable logic that is configured to override and/or supplement firmware or other logic included in an energy management device 202. In an embodiment, the logic in Wi-Fi subsystem 210 may be configured to enable customized control of various aspects of an energy management device 202, to send and receive data from energy management service unit 130, or perform other functions that are not natively provided by energy management device 202.

In an embodiment, Wi-Fi subsystem 210 may comprise various components including a Wi-Fi radio, a processor subsystem, and a computer memory subsystem. In one embodiment, the Wi-Fi subsystem 210 may be incorporated directly into an energy management device 202, or may be included as a separate plug-in device. For example, in one embodiment, Wi-Fi subsystem 210 may be a device conforming to the Utility Smart Network Access Port (USNAP) standard.

In an embodiment, Wi-Fi subsystem 210 is configured to communicate with energy management service unit 130 over the Internet 120, as described above. Communication between Wi-Fi subsystem 210 and energy management service unit may comprise sending energy usage data associated with a commercial appliance 212, sending data detected by sensors 206, and sending energy management device 202 usage and configuration settings. Wi-Fi subsystem 210 may also be configured to receive scheduling templates and other device configuration data from energy management service unit 130, as further described herein. For example, assuming energy management device 202 is a programmable thermostat, Wi-Fi subsystem 210 may be configured to periodically send data to energy management service unit 130 over the Internet 120 including current temperature setpoints, device programming and configuration settings, and other data related to the operation of energy management device 202 and/or a commercial appliance 212.

In an embodiment, a programmable thermostat may initially include firmware or other controllers that include logic to control interface 204 and other operations of the thermostat. In an embodiment, Wi-Fi subsystem 210 may include additional logic programmed to override and/or supplement various aspects of the device firmware logic including restricting user access to particular interface 204 controls and implementing other device configuration changes responsive to communication received from energy management service unit 130. In an embodiment, Wi-Fi subsystem 210 may be configured to receive and cause installation of updated device firmware.

For example, Wi-Fi subsystem 210 may include logic configured to send "last gasp" messages to energy management service unit 130 in the event of an energy management device 202 losing power. In another embodiment, Wi-Fi subsystem 210 may include logic that enables a remote user to manage device calibration and detect calibration errors associated with energy management device 202.

3.2 Energy Management Platform

In an embodiment, energy management service unit 130 comprises an energy management platform 222, energy management applications 230, and application programming interface (API) 238. In an embodiment, the energy management platform 222 comprises a portal 224, data collection module 226, and site groupings module 228, each module described further in the sections below. The modules illustrated in FIG. 2 are provided as examples, and energy management service unit 130 may comprise any number of additional modules including logging, system administration, and other modules or sub-modules. In an embodiment, energy management service unit 130 may comprise additional application-specific modules such as, for example, a module for hotel energy management, a module for refrigeration systems or other appliance-specific systems, and a sub-metering information module.

3.2.1 Data Collection

In an embodiment, data collection module 226 comprises program code and other logic configured to collect and store data from energy management devices and other external data sources. For example, data collected from energy management devices may include energy usage data and energy management device operation and configuration data. Data collection module 226 may also collect and store data from one or more external data sources 240 including, for example, weather data, customer data, and utilities information. In an embodiment, data collection module 226 may store collected data in one or more databases accessible to other modules of energy management service unit 130.

In one embodiment, data collection may be initiated by logic included in an energy management device 202, as described above, the logic configured to periodically or continuously send data collected by the device to data collection module 226. In this manner, data collection module 226 may receive the data sent from the energy management devices and store the data in a data repository. The data received by data collection module 226 may be stored along with one or more identifiers that identify the particular device sending the data, the site at which the sending device is located, and a time the data is sent or received.

In another embodiment, data collection may be initiated by data collection module 226 by sending a collection request to an energy management device 202 at desired time intervals. An energy management device 202 may be configured an energy management device 202 may be configured, in response to receiving a collection request, to collect and transmit the requested data to data collection module 226. Data collection preferences may be defined, in an embodiment, as part of a scheduling template or other device configuration data stored on an energy management device 202 and/or configured by a user using portal 224.

In an embodiment, data collected from an energy management device 202 may include any number of status parameters detected by the device. For example, collected parameters may include inside and outside temperatures, humidity, HVAC mode, HVAC status, heating and cooling setpoints, fan operation modes, energy saving modes, setpoint overrides, setpoint holds, heartbeats, lighting information, motion detection, kilowatt usage, thermowatt usage, natural gas usage, sub-metering information, and other device information.

In an embodiment, data collection module 226 may collect information from one or more external data sources 240. As an example, external data sources 240 may include a weather service that provides information such as current temperatures, daily maximum and minimum temperatures, precipitation, weather forecasts, and other weather related information. As another example, external data sources 240 may include data stored in a customer database such as, for example, utility billing information, utility tariff rates (including time of use rates), demand response program information and associated pricing information, and utility rebate program information. In another embodiment, external data sources 240 may include customer sales information, or other customer site-related information. In an embodiment, information collected from external data sources 240 may be used in conjunction with collected energy usage data to more accurately and advantageously program device templates for particular customers and to provide more detailed analyses of customer energy usage.

In an embodiment, data collection module 226 may collect profiling information associated with customers. The profiling information may be used to compare a specific company's site information against sites with a similar profile. For example, data collection module 226 may collect information related to a company type, store/site type, geographical region, climate zone, utility pricing zone, building size, kilowatt/thermowatt per hour pricing, HVAC unit type, refrigeration unit type, other energy management device types, etc.

In an embodiment, data collection module 226, and other energy management service unit 130 modules, may interface with energy management devices using an application programming interface (services API) that implements particular energy management device functions. With this approach, energy management devices can be modified without affecting the modules at energy management service unit 130, and likewise, energy management service unit 130 may be modified without affecting logic implemented at the energy management devices.

3.2.2 Energy Management Portal

In an embodiment, energy management platform 222 comprises a graphical user interface and associated operating programs, termed portal 224, configured to generate and cause display of a management interface comprising one or more informational dashboards, configuration pages, and other interfaces that facilitate user interaction with the energy management system. In an embodiment, portal 224 may be accessed using a computer such as client machine 250. Client machine 250 may be located on the same local network as an energy management device 202, energy management service unit 130, or on any other network communicable with Internet 120.

In an embodiment, client 250 generally includes any computing device capable of requesting services over a network and includes, for example, personal computers, workstations, laptop computers, netbook computers, smartphones, and tablet computers. As an example, client 250 may comprise a browser that can access HTML documents generated by portal 224. In one embodiment, a client 250 may be integrated into an energy management device 202.

In one embodiment, portal 224 may generate displays that are customized for particular devices. For example, in response to requests for similar information, portal 224 may generate one display in response to detecting that client 250 is a smartphone, and a second display in response to detecting that client 250 is a personal computer. In an embodiment, the generation of informational dashboards, configuration pages, and other displays may be customized for more effective display depending on various characteristics of the client device including, for example, screen size and resolution, processing power, presence of a touch user interface, and connection bandwidth.

In one embodiment, portal 224 may control access to the energy management system based on user access credentials supplied by a user accessing portal 224. In an embodiment, each authorized user may be associated with a user profile that identifies the user's access level within the system. In an embodiment, a user's access level may include defining particular databases that the user may access and whether the user has permission to modify the data or read-only access.

In an embodiment, user profiles may be consistent with users' role in a company organization or other associated with other employment positions. For example, separate user profiles may be established for company executives, regional managers, site managers, or other classes of users. In other embodiments, other customized user profiles may be created for other purposes such as company-wide and system wide-administrators. As other examples, user profiles may be established for users associated with system support, HVAC installation and support, HVAC manufacturers, other users associated with retail or food services, users associated with a utility company, and other industry analysts. The association of users with particular user roles may be configured within a company by a corporate administrative user or by other designated system-wide administrative users.

For example, access levels may be configured such that a site manager may access information, device configurations, and analytics for the particular sites under the site manager's control, but not for the entire company. As another example, a regional manager may access information associated with a plurality sites that are associated with the manager's organizational responsibility. As yet another example, a corporate executive may access aggregated information of many companies in a geographic area or industry to analyze industry benchmarks.

In an embodiment, a user accessing portal 224 may define and configure various aspects of the energy management system in accordance with the user's profile and corresponding access levels. For example, a user may use portal 224 to configure one or more data collection configurations, scheduling templates, site groupings, statistical views, and other elements, as further described in other sections.

3.2.3 Site Groupings

In an embodiment, energy management service unit 130 comprises a site groupings module 228 responsible for implementing the creation and modification of site groupings. In this context, a site grouping is stored data representing a logical grouping of one or more physical, managed sites into a reusable collection that may be used for analysis, controlling user access, application of scheduling templates, and other system-wide purposes. In an embodiment, a site grouping may include any combination of sites and/or other defined site groupings. For example, one or more site groupings may be created that group sites located in each of a number of geographic regions, and a separate site grouping may be created that includes one or more of the geographic region site groupings. Each site may belong to one or more site groupings. In an embodiment, site groupings may be configured by a user using portal 224 and configuration may include the user creating new site groupings, adding or removing one or more sites or other site groupings from an existing grouping, or deleting an existing grouping.

In an embodiment, site groupings may be created based on any number of characteristics including physical form, organizational or hierarchical structures used in non-energy management contexts, geographical regions, and associated users. For example, a corporate executive may desire to set up site groupings for tracking energy management spending for particular sites within the executive's company, grouped by various geographical regions and by regional managers that relate to sales, accounting, or other concepts. As another example, a site manager may desire tracking a site grouping that includes only the sites for which the site manager is responsible. Groups may be associated with financial concepts such as sales regions, territories, or other accounting units; geophysical entities or political units such as states, provinces, or countries; types of trade channels; demographic units; or any other grouping useful in management. Other examples of site grouping types that may be desired include site groupings associated with particular climate regions, particular utility regions, building types, store types (e.g., retail or food service), and HVAC manufacturers or models. For example, various utilities may have different energy usage pricing rates and the effect of the different pricing rates may be tracked across a number of site groupings. Different states may have different tariff rates that are tracked and compared by state site groupings. As another example, sites may be grouped based on climate types and may include sites that are located in disparate geographic regions but that share similar weather patterns.

In the examples, various site groupings may be created that include sites and other site groupings relevant to a users' configuration, monitoring, and/or reporting needs.

In an embodiment, for security and other reasons, site groupings module 228 may maintain stored, persistent associations between stored user profiles and site groupings. In an embodiment, associations between site groupings and user profiles may be configured by a user with sufficient access credentials using portal 224. In an embodiment, users also may have varying levels of access to their assigned groupings. For example, a particular user may be responsible for customer support of a particular region of the country. The user for example, may then be associated with a site grouping that includes one or more sites from multiple companies but because the customer support user is not directly associated with the company, read-only access permission may be given to the energy usage data collected from the sites. This may prevent the customer support user from making unauthorized changes to configurations of scheduling templates and other settings associated with the sites in a grouping.

In an embodiment, site groupings module 228 may enable users with sufficient access to create system configurations for an entire site grouping. For example, a user may associate customized scheduling templates and alarm and reporting configurations with a particular site grouping to which the user has access.

In an embodiment, site groupings module may store one or more default site groupings, such as a grouping that includes all sites within a company, or automatic groupings by states or other characteristics. In an embodiment, a user may create new site groupings, modifying existing site groupings, or remove existing site groupings, using portal 224. For example, a user creating a new site grouping may be presented with a listing of all sites that the user has access to and be able to select one or more of the sites to create a new site grouping. As another example, a user may view all existing site groupings associated with the user and be able to select new sites to add to a grouping or to remove sites from a grouping. The creation and modification of site groupings may be accomplished using any number of user interface controls including dragging and dropping visual representations of sites into groups or creating site grouping lists.

Figure 3:
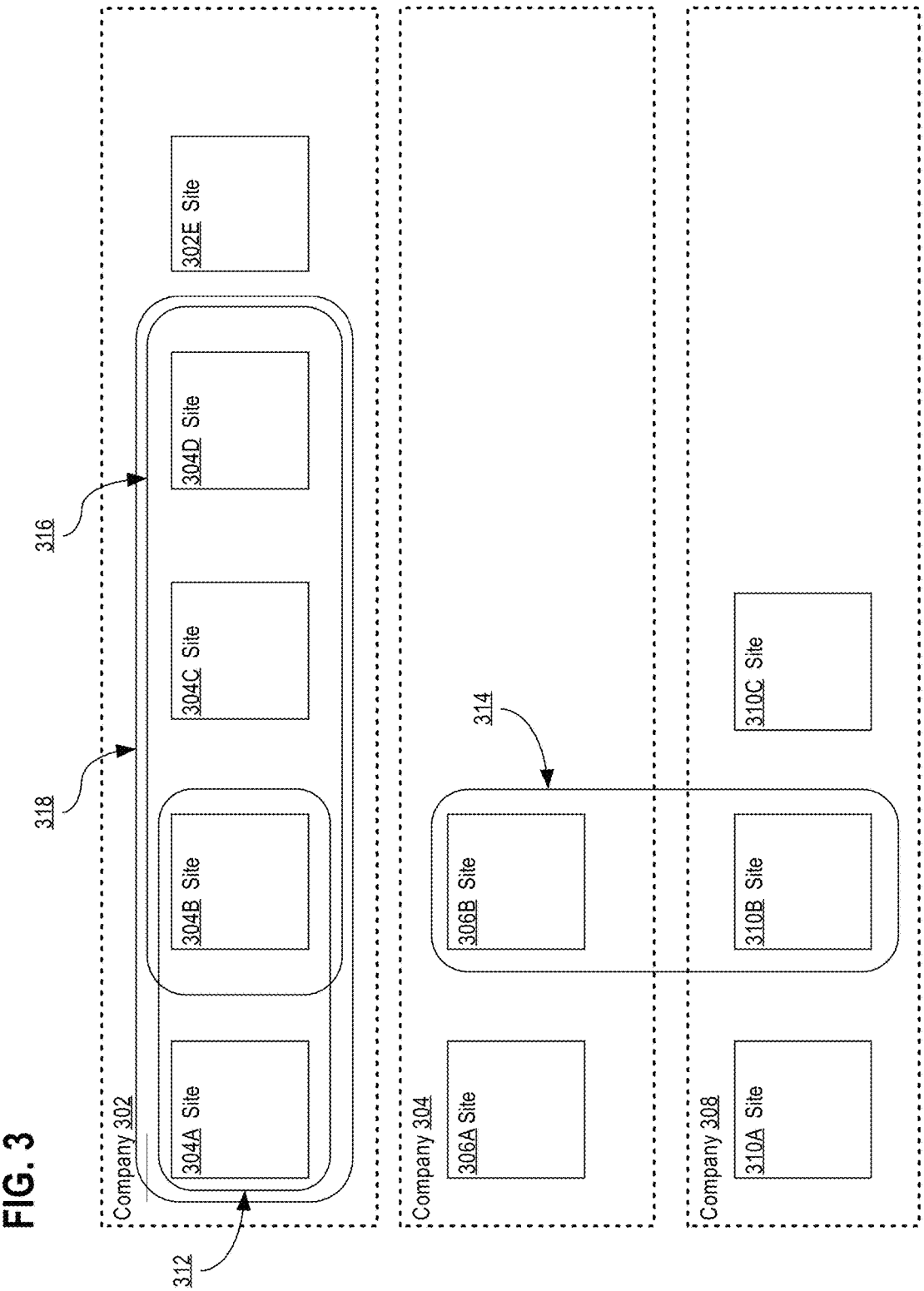
FIG. 3 is a block diagram that illustrates a representation of several example site groupings.

FIG. 3 is a block diagram that illustrates a representation of several example site groupings. Each of companies 302, 304, 308 may represent companies associated with different customers, different companies or company subsidiaries associated with the same customer, or any combination thereof.

Site groupings 312, 316, 318 represent three different site groupings within Company A. Site grouping 312 includes sites 304A, 304B, and may for example represent two sites for which a particular site manager is responsible. Alternatively, site groupings 312, 316 may represent two different regions that are overseen by two different regional managers. As shown by site 304B, a particular site may be included in any number of separate site groupings. For example, site 304B may be under the joint-responsibility of the regional manager responsible for site grouping 312 and the regional manager responsible for site grouping 316. Site grouping 318 illustrates a site grouping that includes two other site groupings, namely, site groupings 312, 316. In an embodiment, the system permits any arbitrary groupings of sites as fits customer requirements.

Site grouping 314 illustrates a site grouping that includes sites associated with each of companies 304, 308. For example, site grouping 314 may represent a grouping of sites that are located in a particular geographic region and that are under the responsibility of a third-party company responsible for servicing appliances at the selected sites. In the example, the third-party service company may be associated with grouping 314 and provided read-only access to the information in order to assess the need for service.

3.2.4 Energy Management Applications

Referring again to FIG. 2, in an embodiment, the energy management service unit 130 comprises various energy management applications 230 that interface with the energy management platform 222 components in order to provide automated control of customer energy management devices, analysis of collected data, and behavioral learning algorithms that leverage the data analysis to tune the operation of the system.

3.2.4.1 Automated Controls

In an embodiment, energy management service unit 130 comprises an automated control module 232 that operates in conjunction with site groupings module 228 to provide centralized configuration and control of a customer's energy management devices across any number of sites. In an embodiment, the automated control module 232 is configured to control energy management devices using one or more scheduling templates and to provide for the detection and reporting of various alarm conditions.

In one embodiment, automated control module 232 enables users to configure and deploy scheduling templates that control the operation of one or more energy management devices. In this context, a scheduling template refers to a configuration file or other data representation that defines one or more energy management device operating parameters to control the operation of one or more energy management devices. Example parameters include device operation settings based on a time of day, based on a yearly calendar, or based on a calendar following weekday, weekend, and holiday schedules. For example, a scheduling template for a thermostat device may define operating parameters that enable changing temperature cooling and heating setpoints, control fan operation, HVAC mode (heating, cooling, auto, and other modes), energy saving modes, setpoint holds, and device operation schedules. As another example, a scheduling template for a lighting control device may define schedules dictating when lights are to be powered on and off and associated lighting levels.

In an embodiment, a user may create, modify, and cause scheduling templates to be deployed to energy management devices using portal 224. For example, portal 224 may include a scheduling template configuration interface that enables users to specify desired scheduling template parameters and cause the configured scheduling templates to be deployed to one or more energy management devices. In an embodiment, a user may associate a particular scheduling template with an individual energy management device at a particular site, with all devices at a site, with sites in one or more site groupings, or across all devices within entire company. In an embodiment, a user may associate scheduling templates with areas within a particular site such as, for example, one scheduling template for energy management devices in a kitchen area, and another scheduling template for energy management devices in a dining room area. In an embodiment, logic in a Wi-Fi subsystem 210 is configured to receive scheduling templates sent from energy management service unit 130 and cause the scheduling template parameters to be implemented by energy management device 202.

In an embodiment, templates may also include feature templates. Feature templates may specify one or more particular device features that are available at a particular device, at devices within one or more sites, or at devices within one or more site groupings. In another embodiment, templates may include alarm templates that specify one or more alarms that are supported by a particular device, within one or more sites, or within one or more site groupings.

In an embodiment, automated control module 232 may include monitoring logic that detects if a deployed scheduling template has been over ridden at a local device. For example, a scheduling template with particular parameters may be deployed to an energy management device 202, and those particular parameters may be subsequently overridden, for example, by a user using interface 204. Automated control module 232 may detect that the deployed scheduling template parameters have been overridden based on received operating data sent by the device. In response to detecting that a scheduling template has been overridden locally at a device, automated control module 232 may cause the device to revert back to the scheduling template by sending an operating command to the device. In an embodiment, automated control module 232 may be configured to generate one or more system alarms and user notifications in response to detecting that a scheduling template is overridden locally at a device.

In an embodiment, automated control module 232 may comprise generic scheduling templates for various types of energy management devices for use as a starting point in configuring certain energy management device types. For example, automated control module 232 may store a generic scheduling template for each of a thermostat, intelligent electrical outlet devices, and a lighting control device. Automated control module 232 may also comprise one or more default scheduling templates for different business types that may be selected by a user and deployed to one or more devices. For example, a default scheduling template may be provided for retail chain stores another template for fast-food chains.

In an embodiment, automated control module 232 comprises a faults and alarms subsystem. In an embodiment, a fault condition may be detected by automated control module 232 and alarm may be generated based in response to one or more conditions detected at an individual site based on collected data including, for example, a temperature setting not being met, an energy management device failing to respond, or other defined fault conditions. In an embodiment, in response to automated control module 232 detecting the occurrence of an fault condition, one or more alarm and/or notification messages may be generated and sent to designated users such as, for example, an email sent to a site manager, SMS message to a technician, or an visual alert displayed in portal 224 to particular users.

3.2.4.2 Analytics

In an embodiment, analytics module 234 mines the data collected by data collection module 226 across site groupings and is configured to provide statistical views detailing patterns in the data, also referred to herein as analytics. The statistical views generated by analytics module 234 may be used to understand historical energy usage patterns and trends in order to improve energy management performance across a customer's sites.

In this context, a statistical view comprises one or more data values generated from data collected and stored by data collection module 226 and using one or more statistical methods. In an embodiment, generated statistical views may be displayed to a user using portal 224 using any number of visual data representations including tables, spreadsheets, charts, graphs, or any other data representations. Statistical views may be generated based on a specified viewing time period such as, for example, the last day, the last week, the last month, or any other custom time range. Statistical views may also be generated based on a specified time scale such as, for example, hourly, daily, weekly, or monthly time periods.

In an embodiment, one or more default statistical views may be stored by analytics module 234 and users may additionally specify one or more custom statistical views using portal 224. Statistical views specified by a particular user may be saved for later use by the user or for use by other users. In an embodiment, statistical views may be made available to users in a downloadable format that a user may download and store locally such as, for example, spreadsheet files, text documents, or in other file formats.

Analytics module 234 may generate statistical views of the collected data on a number of different levels including performance analyses of particular energy management devices, particular sites, site groupings, an entire company, and across companies and particular industries. Analyses performed by analytics module 234 on each of these levels may include statistics based on kilowatt and/or thermostat usage, degree days (heating and/or cooling), electrical dollars spent, natural gas or heating oil dollars spent, total dollars spent, inside and/or outside air temperatures, occupancy rates, HVAC modes and statuses, fan modes, override status, and luminous rates. Statistical views may be generated based on various time granularities such as per hour, per day, per month, etc.

In an embodiment, analytics module 234 may generate an energy management device automated controls efficiency measurement. An efficiency measurement provides a measurement of how a particular customer's energy management devices are managed by human behavior as compared to automated controls. For example, in an embodiment, an energy management device efficiency measurement may be measured as a percentage of how effectively energy management devices are being managed relative to fully automated controls, where 100% automation of an energy management device would be measured as 100% efficiency. In an embodiment, an energy management device efficiency measurement may be generated for a particular customer by performing degree day calculations over a specified time period using data for the customer's thermostats and simulated on the automated control system. In an embodiment, an efficiency percentage may be derived based on the degree day values generated from the customer's thermostats and the automated control system simulation. In one embodiment, the efficiency percentage formula is: 1−((automated control degree days−customer degree days)/automated control degree days).

In one embodiment, analytics module 234 may generate statistical views of collected energy usage data based on site profile information such as, for example, the square footage of various sites, outside temperatures, the difference between inside and outside temperatures, inside temperatures compared to kilowatt or thermowatt usage, accumulated energy or cost savings per time frame, and other site-specific information. In an embodiment, the site profile information may be used to generate statistical views that compare building efficiencies associated with various sites such as the average time required to reach certain temperatures, or the heat dissipation rate of particular sites.

In another embodiment, analytics module 234 may generate statistical views of energy usage data by comparing energy usage data collected across sites or site groupings within a particular company. For example, a statistical view may compare a particular site's kilowatt usage against the average of all company sites and/or the best company site, compare a particular site's average inside and outside temperatures against the average inside and outside temperatures of various sites within the company, compare a site's dollars spent on electricity or utilities against the average and best practice dollars spent of various sites within the company, or compare a site's utilities dollars budgeted against average and best practices of various sites within the company.

In another embodiment, analytics module 234 may be configured to generate statistical views that are independent of company boundaries. For example, analytics module 234 may generate statistical views that compare a particular company's daily kilowatt usage or any other similar metric against an average generated for similar company types, for companies in similar geographic or climate regions, or across all companies.

In an embodiment, analytics module 234 may generate one or more predictive statistical views based on trends derived from the collected data. For example, a statistical view may be generated that calculates predictive savings based upon a calculated number of cooling and heating degree days in the past year. A heating or cooling day is a value based on the difference between the outside air temperature and a cooling or heating setpoint for a given day and may be used as an approximate measure of an HVAC unit's energy requirements. In the example, this figure may be used to estimate increases or decreases in future energy bills based on recent trends in cooling and heating degree days.

In an embodiment, analytics module 234 may generate statistical views that incorporate other data sets, such as data obtained from external data sources 240, in order to provide analyses of energy usage as it relates to other event data. For example, one or more statistical views may be defined that validate billing charges based on collected billing information, generate billing reports, and generate other trending and statistical billing statistics based on stored utility billing information. In another embodiment, analytics module 234 may generate statistical views that compare temperature information recorded for a particular site with the sales information at the site, providing a customer with possible indications of the impact of weather-related conditions (including, for example, inside and outside temperatures, rain fall, humidity, amount of sunlight, and other detectable weather-related conditions) and resulting comfort levels at particular sites on purchasing habits, and enable customers to adjust their energy usage configurations accordingly.

In another embodiment, analytics module 234 may modify various energy management device settings at a particular site for specified time intervals in order to determine optimal energy management device settings for generating sales. For example, analytics module 234 may periodically adjust the inside temperature setting at a particular site and also track purchasing habits at the site during the same time periods. Analytics module 234 may detect that sales at the site increase as the inside temperature at the site approaches a particular temperature, enabling the owner of the site to tune the temperature settings to those settings most conducive to generating sales based on the collected data. The relationship between inside temperature and purchasing habits is used as an example, but in other embodiments any other detectable site conditions and desired behaviors may be used in the analysis.

In an embodiment, analytics module 234 may be configured to generate statistical views that represent data assets valuable to other entities that may not be energy management service customers. For example, an installer of HVAC units may desire information about performance statistics relating to various HVAC installations at particular sites serviced by the installer. As another example, the HVAC performance information may be valuable to various manufacturers of HVAC units for product development or advertisement purposes. Accordingly, in an embodiment, access to some statistical views may be provided to various non-customer entities as an auxiliary data service.

In an embodiment, third-party users may access various system components via API 238. In an embodiment, API 238 may provide controlled third-party access to various statistical views, collected energy usage data, device templates, and other information. In this manner, the data collected and stored in energy management service unit may be provided as a data asset to various third-parties including industry analysts, HVAC manufacturers, utility providers, and others.

3.2.4.3 Behavioral Learning

In an embodiment, energy management applications 230 further comprise a behavioral learning module 236 that includes set of algorithms that are based on learned behaviors. In this context, learned behaviors refer to inferences about user and energy management device behavior drawn from the data collected by data collection module 226. Learned behaviors detected by behavioral learning module 236 may be used assist users in further fine-tuning the control of scheduling template configurations, and to provide intelligent algorithms to control device operation. In an embodiment, learned behaviors may be further analyzed to determine company-wide and industry-wide best practices that may be used as benchmarks for energy efficiency in other modules across the system.

In an embodiment, one example behavioral learning algorithm that may be implemented by behavioral learning module 236 is a floating base temperature algorithm for thermostat devices. Rather than operating strictly according to specified heating and cooling setpoints, a floating base temperature algorithm allows the inside temperature setpoint set by a particular thermostat device to fluctuate, or float, based on the outside temperature and the humidity index at the site at which the device is located.

As an example implementation of a floating base temperature algorithm, consider a thermostat device initially configured with a floating base temperature of 70 degrees and further configured to increase or decrease the inside temperature setpoint in response to corresponding increases and decreases in the outside temperature. Behavioral learning module 236 may program a rule, for example, in an scheduling template implemented by a thermostat device that that causes the thermostat device to increase the inside temperature setting in response to detecting that the outside temperature at the site exceeds a 20 degree difference from the inside temperature setting, with the thermostat device increasing the inside temperature setting one degree for every degree over the 20 degree difference. In an embodiment, a second rule may be programmed in the scheduling template that allows the inside temperature setting to increase only up to a maximum adjusted setting, for example, up to five degrees. In this example, if the outside temperature goes up to 93 degrees, the inside temperature setting will "float" upwards to 73 degrees. The inside temperature setting may continue to increase until the inside temperature reaches the set maximum of 75 degrees, in which case the second rule causes the thermostat device to hold at that temperature. In an embodiment, behavioral learning module 236 may implement floating base point algorithms based on fixed rules configured by a user for particular sites, or based on learned optimization points based on intercompany and/or industry wide comparable site analyses.

Figure 5:
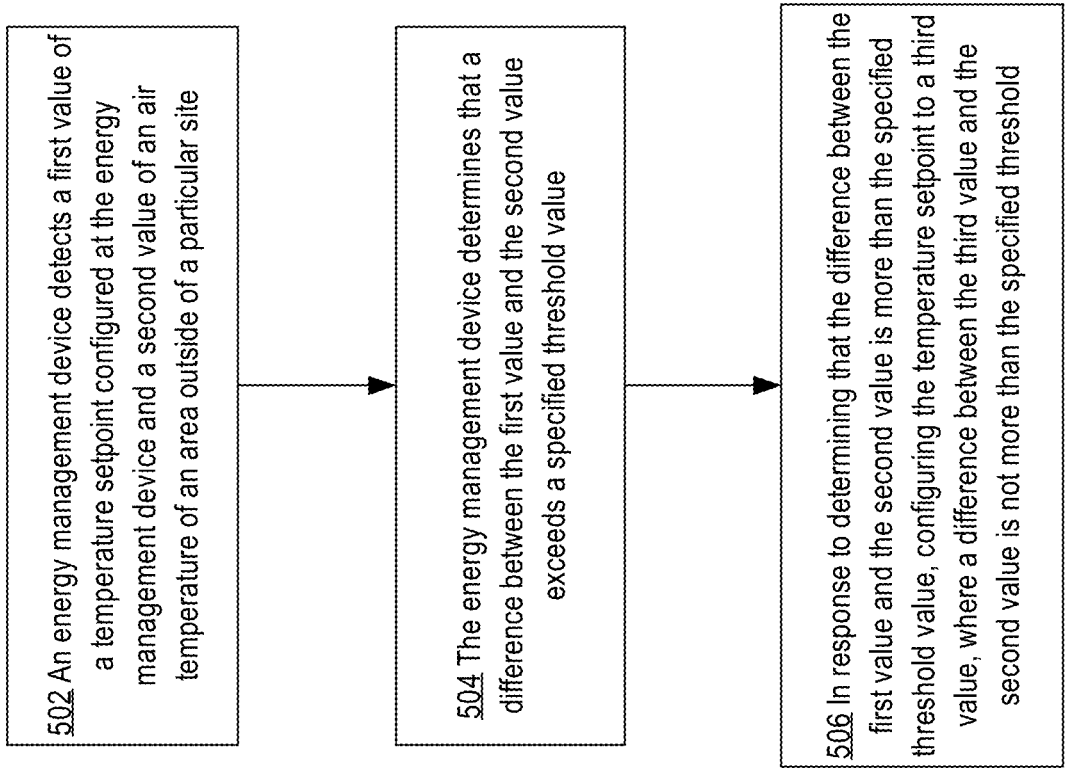
FIG. 5 illustrates a method of setting a floating base temperature in an energy management device located at a particular site.

FIG. 5 illustrates a method of setting a floating base temperature in an energy management device located at a particular site. At block 502, the energy management device detects a first value of a temperature setpoint configured at the energy management device and a second value of an air temperature of an area outside of the particular site. In an embodiment, the second value may be based in part on a humidity index value.

At block 504, the energy management device determines that a difference between the first value and the second value exceeds a specified threshold value. For example, the specified threshold value may be specified in a scheduling template, wherein the scheduling template defines one or more energy management device operating parameters to control operation of the energy management device. In an embodiment, the scheduling template may also specify a maximum temperature setpoint value and a minimum temperature setpoint value, representing maximum and minimum temperature settings that the energy management device should not exceed.

At block 506, in response to determining that the difference between the first value and the second value is more than the specified threshold value, configuring the temperature setpoint to a third value, where the difference between the third value and the second value is not more than the specified threshold. For example, the third value may represent a temperature value that is within the floating temperature range based on the outside air temperature.

In another embodiment, behavioral learning module 236 may interface with portal 224 to present to a user various representations of temperatures settings other than degree numbers. For example, rather than presenting to a particular user using portal 224 an option to configure the temperature setting of a thermostat device to particular degree values, the user may be presented with a temperature scale that presents options that range from comfort at one end and energy cost savings at the other end. Behavioral learning module 236 may then translate a user's selection along the presented scale into an actual temperature value based analyses performed about the cost to heat or cool a site to a particular temperature.

In another embodiment, behavioral learning module 236 may comprise an algorithm for pre-conditioning particular sites based on user settings. A pre-conditioning algorithm may include determining optimal device settings for pre-heating or pre-cooling a site to a desired temperature by a designated time. For example, a user may be aware of a particular time of day that customers or employees typically arrive at a particular site and desire that the site be cooled to a particular temperature by that time each day. In an embodiment, behavioral learning module 236 may determine a time that an energy management device 202 is to begin a cooling or heating operating based on historical data and determining an approximate time it takes to cool the site to the desired temperature. The determined time may be specified in a scheduling template sent to the thermostat device. In this manner, computation of pre-conditioning settings by behavioral learning module 236 prevents excess energy usage by a cooling or heating schedule being set too soon. In other embodiments, a pre-conditioning algorithm may be based in known values such as a room size, an outside temperature, and intercompany and/or industry-wide metrics of sites with similar characteristics. In another embodiment, information may be collected on different sizes and brands of commercial packaged HVAC systems that may be used to determine expected efficiency of heating and cooling for optimal pre-conditioning energy usage. In another embodiment, this information may be used to generate diagnostic information used to determine underperforming HVAC systems based on inappropriate sizing, impending maintenance problems, etc.

Figure 6:
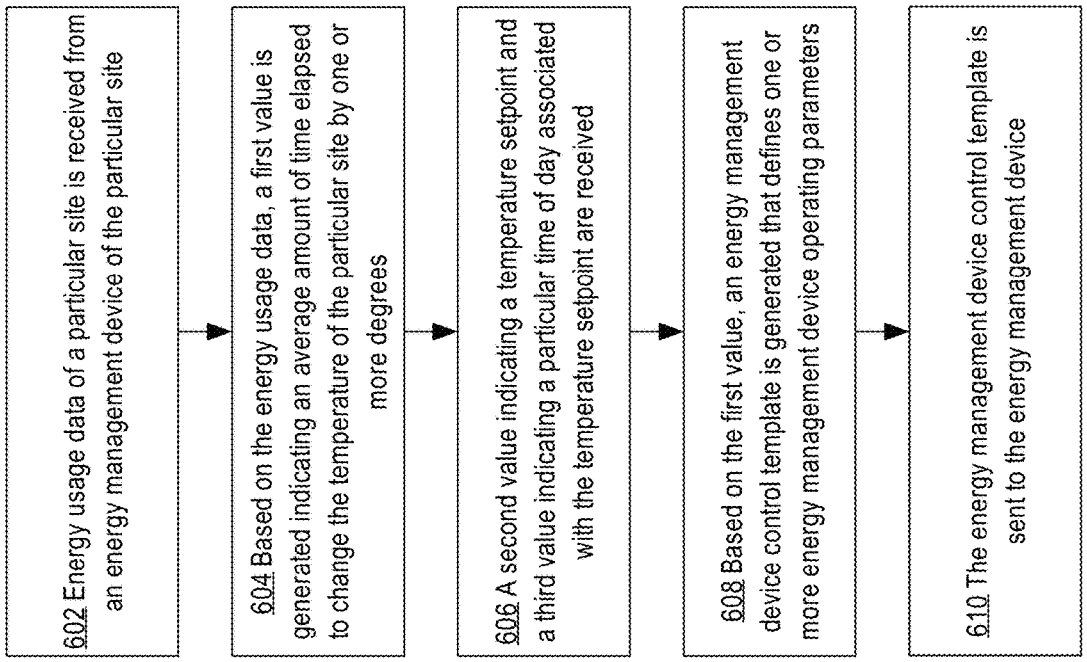
FIG. 6 illustrates a method of illustrates a method of configuring an energy management device to pre-condition a particular site at a specified time.

FIG. 6 illustrates a method of configuring an energy management device to pre-condition a particular site at a specified time. At block 602, energy usage data of a particular site is received from an energy management device of the particular site. The energy usage data includes information indicating one or more temperature setpoints of a particular energy management device of the particular site and, for each of the one or more temperature setpoints, an amount of time elapsed for the particular site to reach the one or more temperature setpoints. At block 604, based on the energy usage data, a first value indicating an average amount of time elapsed to change the temperature of the particular site by one or more degrees is generated.

At block 606, the energy management service unit receives a second value indicating a temperature setpoint for the particular site and a third value indicating a particular time of day associated with the temperature setpoint. For example, the second value may represent a temperature that a user desires the particular site to reach, and the third value may represent a designated time that the user desires the site to reach the specified temperature.

At block 608, based on the first value, an energy management device control template is generated that defines one or more energy management device operating parameters. The operating parameters include a fourth value indicating a particular time of day to initiate operation of the energy management device. For example, the third value may represent an appropriate amount of time prior to the user-designated time in order to ensure that the site reaches the specified temperature by the user-designated time. In an embodiment, the template comprises a stored set of name-value pairs, a stored structured data file, a file expressed in XML or another structured markup language, or another stored data representation from which parameter values can be obtained.

At block 610, the energy management device control template is sent to the particular energy management device.

In another embodiment, behavioral learning module 236 is configured to implement various diagnostics and alarming algorithms based on analyzing statistical trending data. Behavioral learning module 236 may evaluate collected data associated with particular energy management devices, particular sites, or with an entire company. For example, in response to the detecting initiation of a particular temperature setting by a thermostat device at a particular site, behavioral learning module 236 may monitor the amount of time the HVAC system is activated and/or amount of energy consumed required to heat or cool the site to the particular temperature setting. In an embodiment, behavioral learning module 236 may store this information and the information may be analyzed over time in order to evaluate the condition of an HVAC unit at the site. For example, the information may be used to provide analytics measuring the amount of time required to raise or lower the temperature at a site per temperature degree, the amount of time the HVAC system is in run mode to raise or lower the temperature at a site per temperature degree, and the kilowatt hours consumed in order to raise or lower the temperature a site per temperature degree. As the performance of the HVAC unit degrades over time, that degradation may be measured based on the time measurements and reported to the user. In other embodiments, HVAC degradation may be analyzed based on measuring overall unit run time, actual usage of thermowatt and/or kilowatt hours, or based upon inter-company or industry-wide metrics of companies or sites with similar characteristics. In an embodiment, an alarm may be set to alert the user that the HVAC is underperforming by a specified percentage relative a base point performance level.

Figure 7:
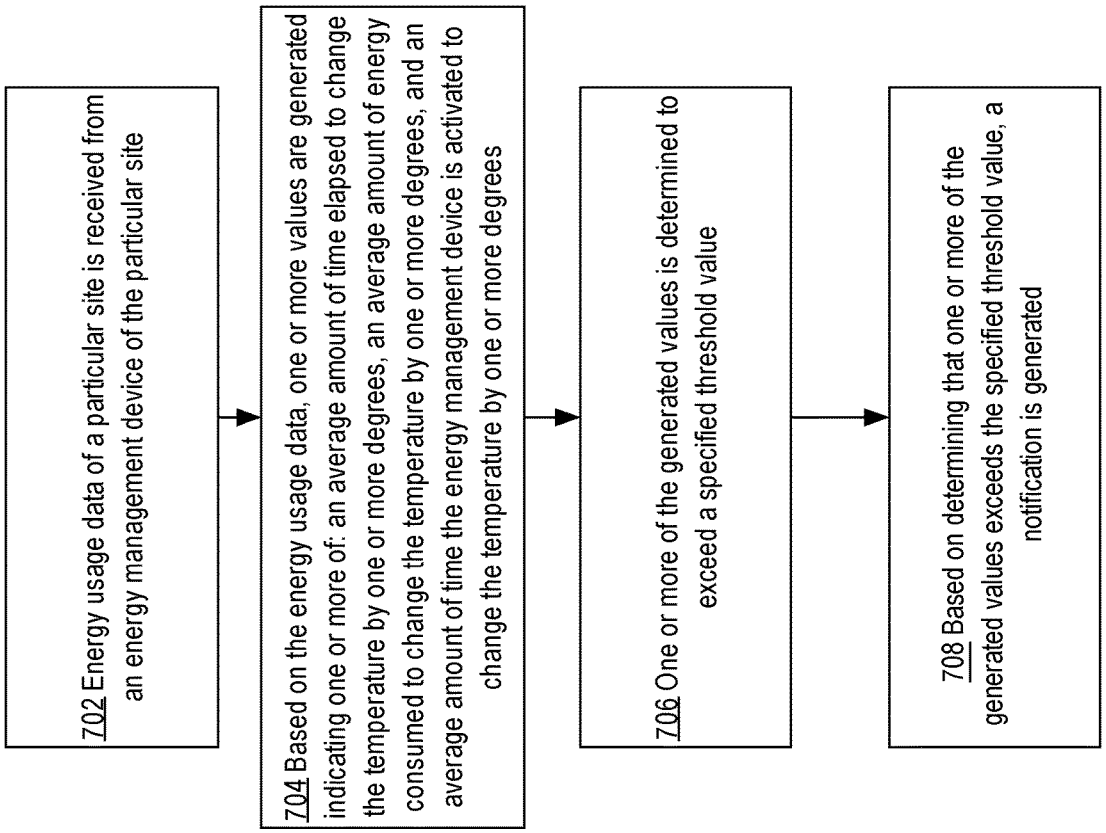
FIG. 7 illustrates a method of measuring the degradation of an HVAC unit at a particular site.

FIG. 7 illustrates a method of measuring the degradation of an HVAC unit at a particular site. At block 702, energy usage data of a particular site is received from an energy management device of the particular site. The energy usage data includes information indicating one or more temperature setpoints of a particular energy management device of the particular site and, for each of the one or more temperature setpoints, one or more first values indicating one or more of: an amount of time elapsed for the particular site to reach each of the one or more temperature setpoints, an amount of time the particular energy management device is activated to reach each of the one or more temperature setpoints, and an amount of energy consumed by the particular energy management device to reach each of the one or more temperature setpoints.

At block 704, based on the energy usage data, one or more second values are generated indicating one or more of: an average amount of time elapsed the HVAC system is activated, an average amount of energy consumed, to change the temperature of the particular site by one or more degrees, and an average amount of time the particular energy management device is activated to change the temperature of the particular site by one or more degrees.

At block 706, it is determined that one or more of the one or more second values exceeds a specified threshold value. At block 708, in response to determining that one or more of the one or more second values exceeds a specified threshold value, a notification is generated. For example, the alarm may be an alert sent to a user associated with the particular site at which the HVAC unit is located such as an email message, a Short Message Service (SMS) message, or an alert displayed on a web portal.

In another embodiment, behavioral learning module 236 comprises algorithms for projecting energy costs and energy cost savings. For example, degree day measurements for a particular time period may be compared to energy consumption measurements for the same time period to derive a measurement of energy consumption per degree day. The energy consumption per degree day measurement may be compared with other time periods, for example, same-month comparisons year over year or rolling 3-month comparisons year over year, in order to determine a projected savings value.

In another embodiment, degree day usage based upon forecasted weather conditions and energy consumption per degree day measurements may be used to predict future energy consumption costs for a specified time period. For example, a predicted number of degree days for the specified time period may be generated based upon forecasted weather conditions. The predicted number of degree days may be multiplied by the energy consumption per degree day measurement and the cost per kilowatt hour to derive a predicted cost for energy during the specified time period.

In another embodiment, alarms may be detected and reported by behavioral learning module 236 based on the occurrence of particular short-term trending events. For example, behavioral learning module 236 may detect that at a particular site the time period to reach a particular temperature setting is exceptionally long, or that a particular site is unable to sustain a temperature because, for example, an environmental problem such as a window left open at the site, or because the HVAC unit is broken. In other embodiments, alarm conditions may include detecting that an HVAC unit is set in an "off" mode, detecting that energy management device settings have been manually adjusted, and detecting that a Wi-Fi-based energy management device is no longer communicating. In response to the detection of a specified alarm event, behavioral learning module 236 may be configured to generate a specified one or more user alerts.

In another embodiment, behavioral learning module 236 comprises algorithms for monitoring manual adjustments to energy management devices at a particular site. The monitoring of manual adjustments may be used to generate analytics that analyze behavior patterns of energy management device users. For example, analytics may be generated that indicate days and times of day that manual adjustments are made to energy management devices, indicate which particular thermostats are being adjusted, and that indicate site occupancy patterns.

In another embodiment, behavioral learning module 236 comprises algorithms for implementing a demand response application. For example, the demand response application may manage the shedding of load in response to a request by a utility or market price conditions. In an embodiment, services, such as lighting or HVAC, may be reduced according to a preplanned load prioritization scheme during critical time frames.

4.0 Implementation Mechanisms—Hardware Overview

Figure 4:
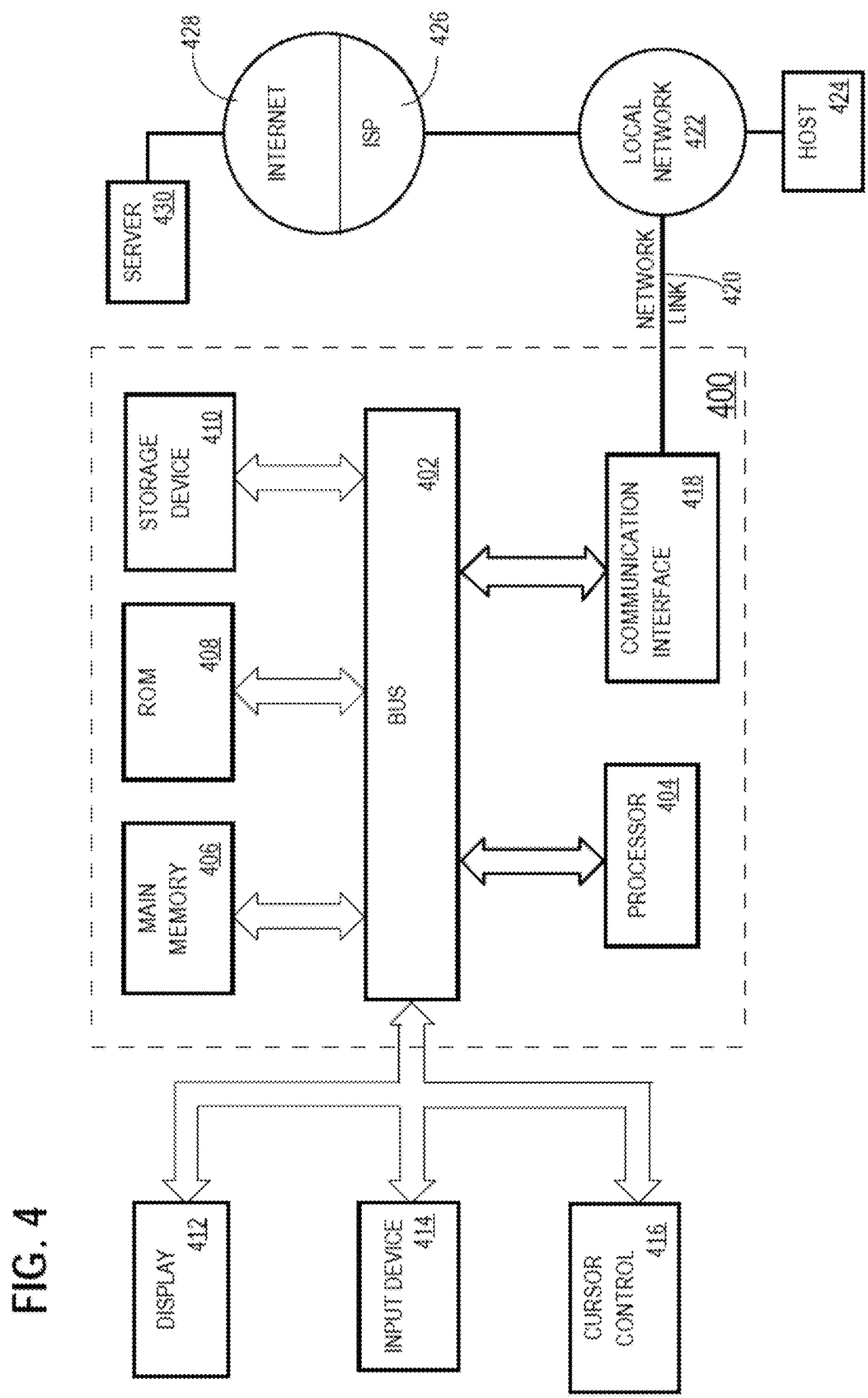
FIG. 4 illustrates an example general purpose computer system that may be used to implement aspects of an embodiment.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426, for example a server 430. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

What is claimed is:

1. A computer-implemented method, comprising:
   receiving, by an energy management service unit that is configured to be coupled to a plurality of energy management devices of a plurality of sites, energy usage data of a particular site of the plurality of sites;
   wherein the energy usage data includes information indicating one or more temperature setpoints of a particular energy management device of the particular site and, for each of the one or more temperature setpoints, one or more first values indicating one or more of: an amount of time elapsed for the particular site to reach each of the one or more temperature setpoints, an amount of time the particular energy management device is activated to reach each of the one or more temperature setpoints, and an amount of energy consumed by the particular energy management device to reach each of the one or more temperature setpoints;
   generating, based on the energy usage data, one or more second values indicating one or more of: an average amount of time elapsed to change the temperature of the particular site by one or more degrees, an average amount of time the particular energy management device is activated to change the temperature of the particular site by one or more degrees, and an average amount of energy consumed by the particular energy management device to change the temperature of the particular site by one or more degrees;
   determining that one or more of the one or more second values exceeds a specified threshold value;
   in response to determining that one or more of the one or more second values exceeds the specified threshold value, generating and sending a notification to a device to control an operation of at least one of the plurality of energy management devices.

2. The computer-implemented method of claim 1, wherein the notification includes one or more of: an email message, a Short Message Service (SMS) message, an alert message displayed on a web portal.

3. The computer-implemented method of claim 1, wherein the energy management device comprises a programmable thermostat including a Wi-Fi subsystem, and wherein the energy management device is configured to periodically send particular energy usage data to the energy management service unit.

4. The computer-implemented method of claim 1, wherein the one or more first values indicate a humidity index.

5. The computer-implemented method of claim 1, further comprising:
   in response to the notification, causing at least one of the plurality of energy management devices to change at least one of the one or more temperature setpoints at the site of the plurality of sites corresponding to the at least one of the plurality of energy management devices.

6. The computer-implemented method of claim 1, wherein the notification comprises a temperature scale including a range of options according to comfort and energy cost savings; and
   in response to an instruction including one option of the range of options, causing at least one of the plurality of energy management devices to change at least one of the one or more temperature setpoints at the site of the plurality of sites corresponding to the at least one of the plurality of energy management devices.

7. The computer-implemented method of claim 6, further comprising identifying the range of options using a maximum temperature setpoint value and a minimum temperature setpoint value.

8. The computer-implemented method of claim 1, wherein the energy management device is configured to periodically send particular energy usage data to the energy management service unit via a wireless link.

9. A non-transitory computer-readable data storage medium storing one or more sequences of instructions which when executed by one or more processors cause the one or more processors to perform:
   receiving, by an energy management service unit that is configured to be coupled to a plurality of energy management devices of a plurality of sites, energy usage data of a particular site of the plurality of sites;
   wherein the energy usage data includes information indicating one or more temperature setpoints of a particular energy management device of the particular site and, for each of the one or more temperature setpoints, one or more first values indicating one or more of: an amount of time elapsed for the particular site to reach the each of the one or more temperature setpoints, an amount of time the particular energy management device is activated to reach each of the one or more temperature setpoints, and an amount of energy consumed by the particular energy management device to reach each of the one or more temperature setpoints;
   generating, based on the energy usage data, one or more second values indicating one or more of: an average amount of time elapsed to change the temperature of the particular site by one or more degrees, an average amount of time the particular energy management device is activated to change the temperature of the particular site by one or more degrees, and an average amount of energy consumed by the particular energy management device to change the temperature of the particular site by one or more degrees;
   determining that one or more of the one or more second values exceeds a specified threshold value;
   in response to determining that one or more of the one or more second values exceeds the specified threshold value, generating and sending a notification to a device to control an operation of at least one of the plurality of energy management devices.

10. The non-transitory computer-readable data storage medium of claim 9, wherein the notification includes one or more of: an email message, a Short Message Service (SMS) message, a log file entry, an alert message or alarm message displayed on a web portal.

11. The non-transitory computer-readable data storage medium of claim 9, wherein the energy management device comprises a programmable thermostat including a Wi-Fi subsystem, and wherein the energy management device is configured to periodically send particular energy usage data to an energy management service unit.

12. The non-transitory computer-readable data storage medium of claim 9, wherein the one or more first values indicate a humidity index.

13. The non-transitory computer-readable data storage medium of claim 9, wherein the sequences of instructions which when executed further cause the one or more processors to perform, in response to the notification, causing at least one of the plurality of energy management devices to change at least one of the one or more temperature setpoints at the site of the plurality of sites corresponding to the at least one of the plurality of energy management devices.

14. The non-transitory computer-readable data storage medium of claim 9, wherein the notification comprises a temperature scale including a range of options according to comfort and energy cost savings; and wherein the sequences of instructions which when executed further cause the one or more processors to perform:
  in response to an instruction including one option of the range of options, causing at least one of the plurality of energy management devices to change at least one of the one or more temperature setpoints at the site of the plurality of sites corresponding to the at least one of the plurality of energy management devices.

15. The non-transitory computer-readable data storage medium of claim 14, wherein the sequences of instructions which when executed further cause the one or more processors to perform, identifying the range of options using a maximum temperature setpoint value and a minimum temperature setpoint value.

16. The non-transitory computer-readable data storage medium of claim 9, wherein the energy management device is configured to periodically send particular energy usage data to the energy management service unit via a wireless link.

* * * * *